United States Patent
Zhao et al.

(10) Patent No.: US 9,575,252 B2
(45) Date of Patent: Feb. 21, 2017

(54) OPTICAL FIBER WELDING MACHINE

(75) Inventors: Yangri Zhao, WeiHai (CN); Dehai Ji, WeiHai (CN)

(73) Assignee: INNO INSTRUMENT (CHINA) INC., Weihai (CN)

( * ) Notice: Subject to any disclaimer, the term of this patent is extended or adjusted under 35 U.S.C. 154(b) by 265 days.

(21) Appl. No.: 14/127,172

(22) PCT Filed: May 14, 2012

(86) PCT No.: PCT/CN2012/075456
§ 371 (c)(1),
(2), (4) Date: Dec. 18, 2013

(87) PCT Pub. No.: WO2012/174958
PCT Pub. Date: Dec. 27, 2012

(65) Prior Publication Data
US 2014/0102642 A1    Apr. 17, 2014

(30) Foreign Application Priority Data

Jun. 21, 2011  (CN) .................. 2011 2 0210699 U
Jun. 21, 2011  (CN) .................. 2011 2 0210719 U

(51) Int. Cl.
*G02B 6/255*    (2006.01)
*F16B 5/02*    (2006.01)

(52) U.S. Cl.
CPC ............. *G02B 6/2553* (2013.01); *G02B 6/255* (2013.01); *F16B 5/02* (2013.01)

(58) Field of Classification Search
CPC ..... G02B 6/255; G02B 6/2551; G02B 6/2553; G02B 6/2555
See application file for complete search history.

(56) References Cited

U.S. PATENT DOCUMENTS

| 3,508,805 A * | 4/1970 | Bray ........................ G02B 7/28 359/418 |
| 4,306,715 A * | 12/1981 | Sutherland ........... A63B 21/078 482/104 |
| 7,292,765 B2 * | 11/2007 | Sato ..................... G02B 6/2551 385/136 |

FOREIGN PATENT DOCUMENTS

CA    2139789 A1 *  7/1996
CN    202102142 U *  1/2012
(Continued)

*Primary Examiner* — Michael Tolin
(74) *Attorney, Agent, or Firm* — Anova Law Group, PLLC

(57) ABSTRACT

The present disclosure discloses an optical fiber welding machine, including a device for butt joint of the optical fiber's core. The said device comprises a base and a number of units with V-shape groove. The base and the units are shaped respectively. The said units are mounted on the base fixedly. Comparing with the traditional overall molding device for butt joint of the optical fiber's core, the disclosed embodiment splits said traditional device, which has complicated structure and high accuracy requirements, into a base and a number of V-shape groove units, thus simplifies the shape of the components, which are shaped respectively, so as to facilitate the purpose of molding mould and shaping components, and then the v-shape groove units are mounted on the base. After completion of assembly, a v-shaped slot is grooved on top of each v-shape groove unit to ensure enough precision. The disclosed embodiment reduces both the mold manufacturing cost and the molding cost of components. It also solves the long-standing problem of precision within the art of manufacturing mold and molding components, and there is a good application prospect. In addition, an electrode gland is included in the optical fiber welding machine. The said gland includes a gland body and a screw connecting the workbench through the gland body, (Continued)

and a rotation unit is set at the top of each screw. The rotation unit protrudes from the gland body.

11 Claims, 6 Drawing Sheets

(56) References Cited

FOREIGN PATENT DOCUMENTS

| | | | |
|---|---|---|---|
| CN | 202162529 U | * | 3/2012 |
| JP | 2008-116840 A | * | 5/2008 |

* cited by examiner

OPTICAL FIBER WELDING MACHINE

TECHNICAL FIELD

This application relates to the optical fiber welding field, especially relates to an optical fiber welding machine.

BACKGROUND ART

An optical fiber welding machine is used to connect two optical fiber segments. The two optical fiber segments are placed in V-shape grooves respectively at the same time, and the ends of the fiber segments contact with each other, then a pair of electrodes are putted near the contact point of the fibers, then high voltage is applied on the electrodes to generate arc discharge, and the point of contact is fused by the heat generated by the arc discharge, so as to fuse with the two fiber segments and complete the connection.

First of all, the following problems may exist in the structure of device for butt joint of the optical fiber's core (hereafter referred to as a butt point device or a core device):

As the diameter of the optical fiber is only a few tens of microns, the dust in the air falls into the v-shaped track of fibers easily during working, then the alignment of the fiber is affected, leading to loss of fusion welding. Both devices for butt joint and non-butt joint of the optical fiber's core are adopted in current market, and the device for non-butt joint of the optical fiber's core works inefficiently, and the loss is not stable. Although the device for butt joint of the optical fiber's core is expensive, it has high efficiency, stable loss, more demand of market. Because the butt joint device has complex structure, the cost of integrated mold is higher, and the mold manufacturing and component shaping are difficult. In the existing domestic thermosetting molding technology, the precision of the material and molding equipment, which is used to manufacture the thermosetting mold with high precision, is poor. Meanwhile the dimension stability of raw materials is not enough, which is not conducive to make the components with complex shape and high precision.

Then, electrode plates have the following possible defects:

An electrode is connected to the high voltage power supply equipment, and the tip of the electrode is tapered to ensure it easy to produce arc discharge. The cone shape of electrode tips must be very accurate in order to correctly complete the connection of fine fiber. But after several times of arc discharging, the electrode will wear gradually, thus the shape and the location of the arc discharge will change, and heat is added to wrong location of the optical fiber, leading to that two pieces of fiber cannot be connected to each other normally, may also cause a defect product when it is serious, when the electrode need to be replaced. An electrode is located on the workbench by an electrode gland, and thus the electrode gland must be removed in replacement. Current electrode glands have screws, and fix to the workbench by the screws. When remove the screw, we need to use a special screw wrench to unscrew the screw, and then the electrode gland is removed, the electrode is taken off from the workbench and the replacement is done. When the new electrode is installed, firstly the new electrode must be put on specific location of the workbench, then the electrode gland is placed on the workbench, and then the gland is fixed to the workbench and the new electrode is located by fastening the screw using the special wrench. Due to the small size of the electrode gland screw, special wrenches are needed to be used to tighten or loosen it. It is easy to get the wrench lost in daily work, and it is difficult to find other alternative tools, leading to difficulty to install or remove the electrode gland and replacement, bringing much inconvenience to the work.

SUMMARY

The purpose of this disclosure is to provide a kind of optical fiber welding machine, in order to solve the said mold manufacturing and part molding difficult problem caused by complex shapes and structures of the butt joint device in the prior technology.

The said purpose is achieved by the following technical solutions:

An optical fiber welding machine includes a device for butt joint of the optical fiber's core, and said device comprises a base and a number of V-shape groove units, wherein the base and the units shaped respectively, and said units are mounted on the base fixedly.

The butt joint device also includes a number of screws, and said units are mounted on the base by the screws.

The said device includes buckles and slots, set on the base and on the units respectively, which matching to each other, and said units are mounted on the base by clamping the buckles to the slots.

The said units are mounted on the base by welding.

The said units are mounted on the base by pasting.

The said units are mounted on the base crossing relatively, and a v-shaped slot for holding the optical fiber is grooved on top of each unit.

The said each unit is a one piece unit, or said each unit comprises of two pieces, which are molded separately and fixed firmly.

An electrode gland is included in the optical fiber welding machine, and said gland includes a gland body and a screw via which the gland body is connected to a workbench, and a rotation unit is set at the top of the screw, and the described rotation unit protrudes from the gland body.

The said rotation unit is a nut protruding from the gland body.

The said rotation unit is a handle protruding from the gland body.

The said handle is shaped in the structure of L, D, T, or cross.

Compared with the prior art, this disclosure has the following beneficial effects:

Comparing with the traditional overall molding optical fiber melding machine, the present disclosure splits said butt point device, which has complicated structure and high accuracy requirements, into a base and a number of units with V-shape groove, thus simplifies the shape of components, which are shaped respectively, so as to facilitate the purpose of mold processing and shaping components, and then units with V-shape groove are mounted at the base. After completion of assembly, a V-shaped slot is grooved on top of each V-shape groove unit to ensure enough precision, and get the butt point device of the disclosed embodiments. The disclosed embodiment reduces both the mold manufacturing cost and the shaping cost of components. It also solves the long-standing precision problem of mold manufacturing and component shaping in the art, and there is a good application prospect.

There is a rotation unit, which can be twisted directly by hand, on the top of the screw of the electrode gland in the optical fiber welding machine of the disclosed embodiments. When disassembling the electrode gland, we only need to twist the rotation unit manually to loosen or tighten the screw, needing no spanner, and it is more convenient to disassemble the electrode gland.

EMBODIMENTS

The disclosed embodiments are described in detail combined with the appended drawings below.

Embodiment 1

Figure 1:
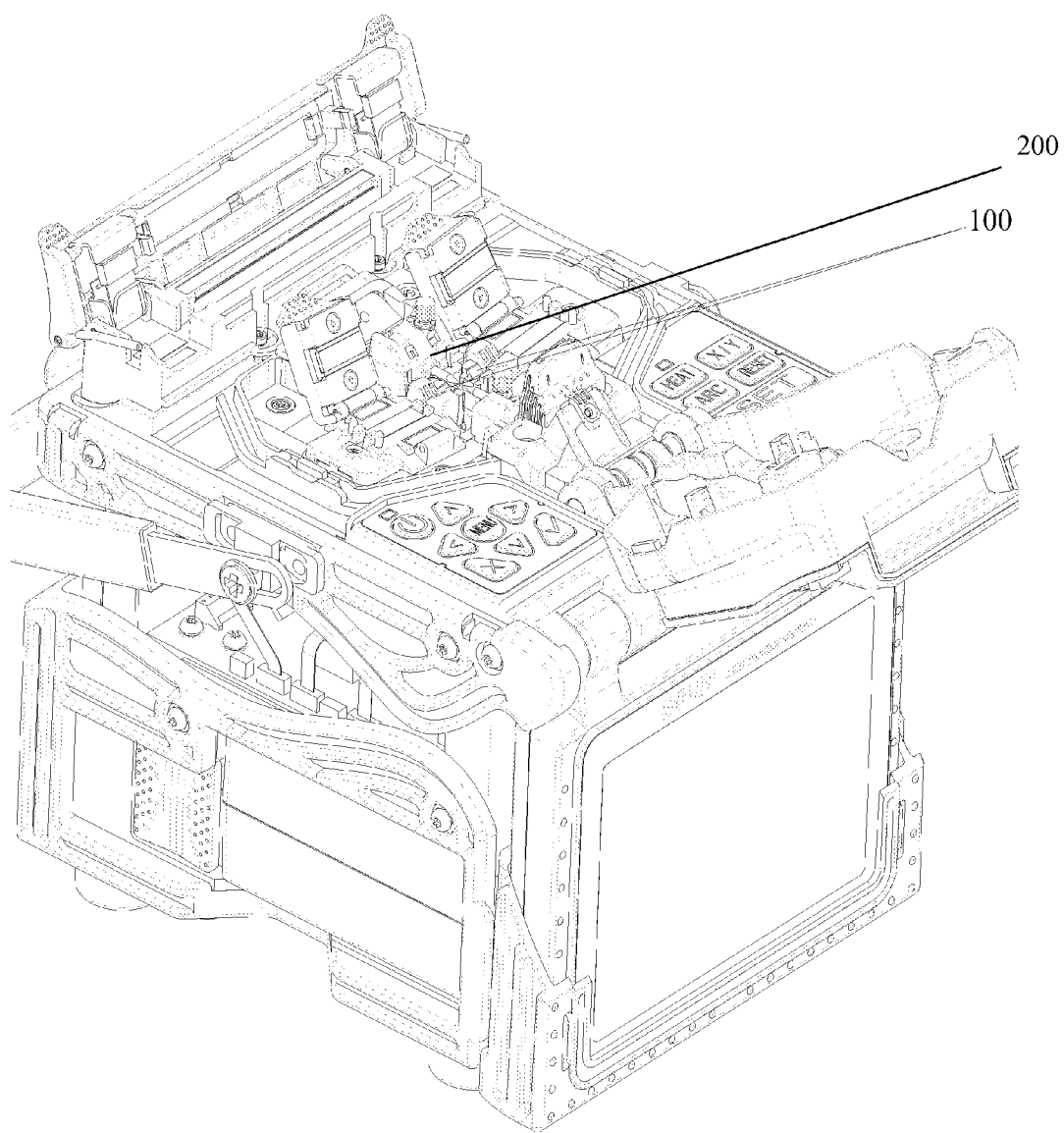
FIG. 1 is the overall figure for the optical fiber welding machine of the disclosed embodiments.
Figure 2:
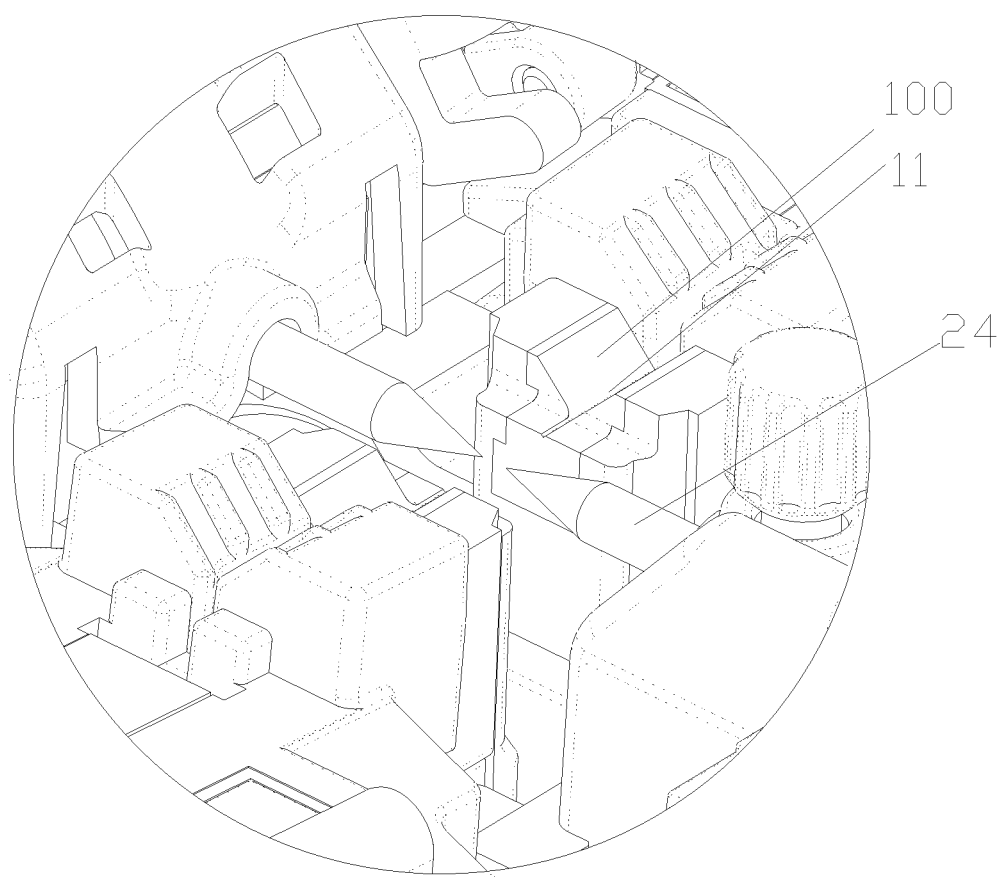
FIG. 2 is a partial enlargement figure of the optical fiber welding machine.

As shown in FIG. 1-5, the optical fiber welding machine of the disclosed embodiments includes the core device 100 installed in the center of the whole machine, whose core part stretches out to make a 90 degree angle between the fiber placement V groove 11 and the electrode rods 24 (FIG. 2). Because the said device is the key unit of the optical fiber welding machine, and it's processing precision have direct impact on the precision of a preset angle (such as 90 degrees) between the optical fiber placed in itself and the electrode rods 24, the processing is very difficult.

For the purpose, the core device 100 of the disclosed embodiments includes two V grooves 1 and a base 2, independently processed and set. The V grooves 1 and base 2 are formed respectively, that is, the part structure is relatively simple and the forming precision and mould opening difficulty are reduced. Then the V-shape groove 1 and base 2 are assembled, that is, the V groove units 1 is connected to the base 2 fixedly. And in the said assembly process, the angle precision during the installation process can be controlled. And, if a whole V groove machining accuracy cannot meet the requirements, V groove 1 can also be split into two slot units. And the two slot units can be assembled fixedly to form up a V groove 1, and in the assembly process of the V groove 1 the angle precision of the V groove 1 can be controlled too.

Figure 3:
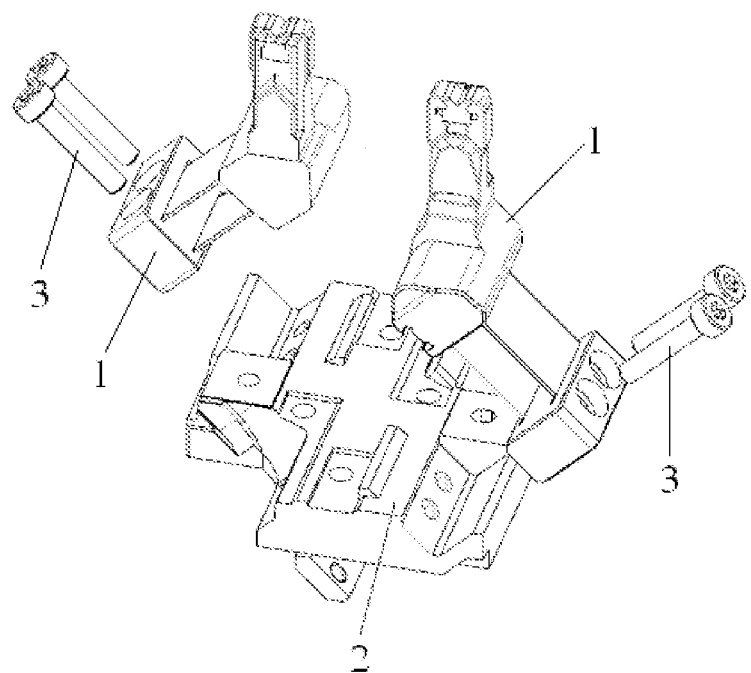
FIG. 3 is the decomposition figure for the implementation of the core device in the optical fiber welding machine.

In this example, V groove 1 can be assembled and connected to base 2 in many ways, such as 1, as shown in FIG. 3, two V groove units 1 are connected to the corresponding positions of the base 2 via screws 3, so as to realize the assembly and fixation of V groove 1 to the base 2; And such as 2, buckles and the corresponding slots are set on the base and V groove units respectively, and the V groove units can be assembled and fixed on the base by clamping the buckles to the slots; And such as 3, V groove units can also be welded on the base to complete the assembly; And such as 4, V groove units can also be bonding to the base to complete the assembly; And so on.

Figure 4:
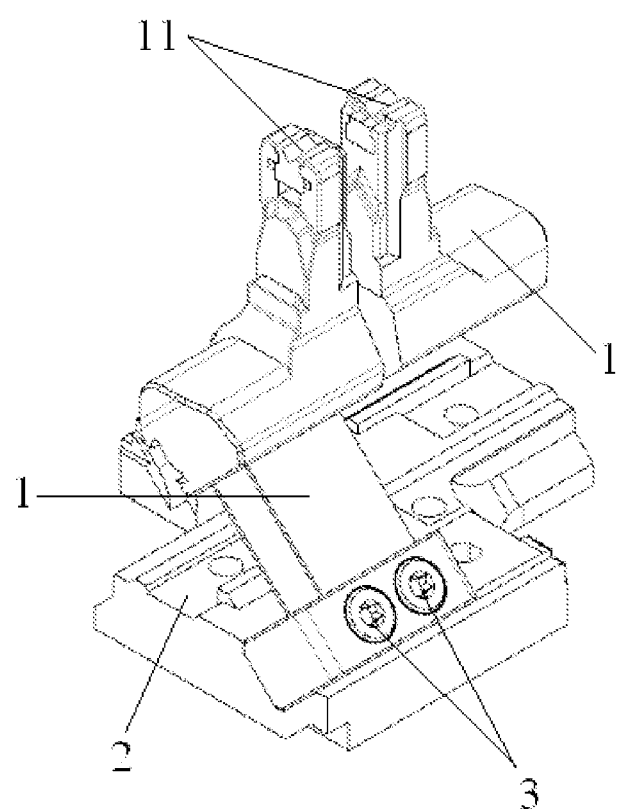
FIG. 4 is a structure schematic diagram of the core device in FIG. 3 after assembly.
Figure 5:
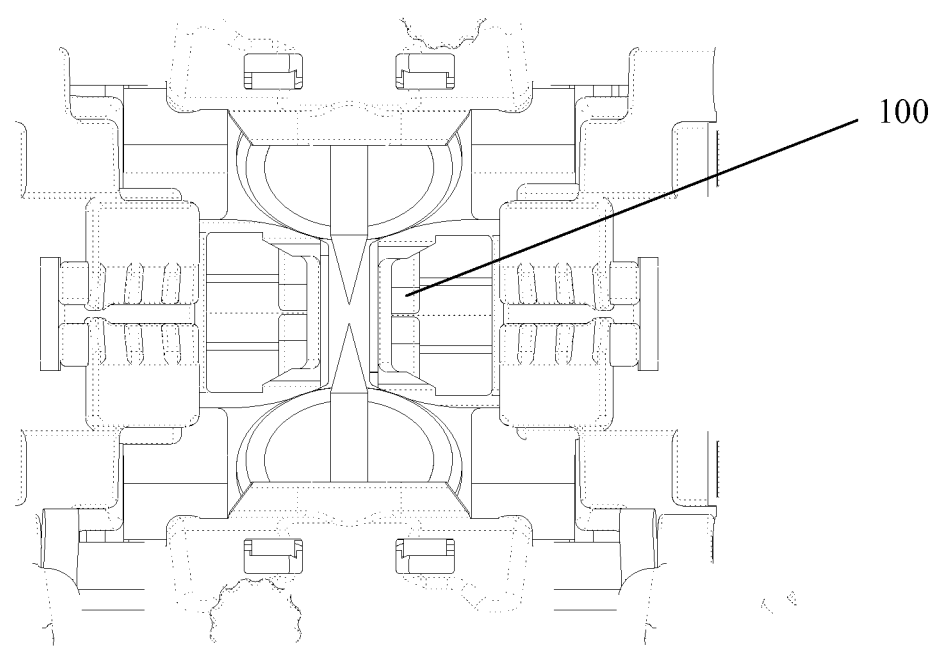
FIG. 5 is the local overlook schematic diagram of the optical fiber welding machine.

After completion of assembly, as shown in FIG. 4, the two V groove units 1 are fixed on the base 2 crossing relatively. V groove 11 is set up at each top of the two V groove units 1 respectively for holding the fiber, and the V groove 11 can be opened after V groove unit 1 are assembled and fixed on the base 2, also can be opened at the meantime the V groove units 1 is formed up. Opening V-shaped groove 11 after V groove units 1 are assembled can guarantee a higher accuracy of the core device of the optical fiber welding machine of the disclosed embodiments.

In addition, when the V groove unit or base of the disclosed embodiments damages, it can be removed and replaced, and the remaining parts continue to work, and it is conducive to save resources and reduce the cost.

Comparing with the traditional overall molding optical fiber melding machine, the disclosed embodiment splits said butt point device, which has complicated structure and high accuracy requirements, into a base and a number of units with V-shape groove, thus simplifies the shape of components, which are shaped respectively, so as to facilitate the purpose of mold processing and shaping components, and then units with V-shape groove are mounted at the base. After completion of assembly, a V-shaped slot is grooved on top of each V-shape groove unit to ensure enough precision, and get the butt point device of the disclosed embodiments.

The disclosed embodiment reduces both the mold manufacturing cost and the shaping cost of components. It also solves the long-standing precision problem of mold manufacturing and component shaping in the art, and there is a good application prospect.

As shown in FIG. 6-9, the optical fiber welding machine of the disclosed embodiments also includes an electrode gland 200 including the electrode gland body 21 and the screw 22, and the screw 22 connecting the workbench 23 passing through the electrode gland body 21 to fix the electrode gland body 21 to the workbench 23 and further locate the electrodes 24 within the V groove 31. For facilitating to disassemble the electrode gland manually when replacing the electrodes, the disclosed embodiments set rotation unit on the top of the screw 22, and the rotation unit protrudes from the body of the electrode gland 21 to provide with convenience for twisting the rotation unit directly by hand.

The rotation unit in the embodiments has many forms, and the below examples are only for description.

EXAMPLE ONE

Figure 6:
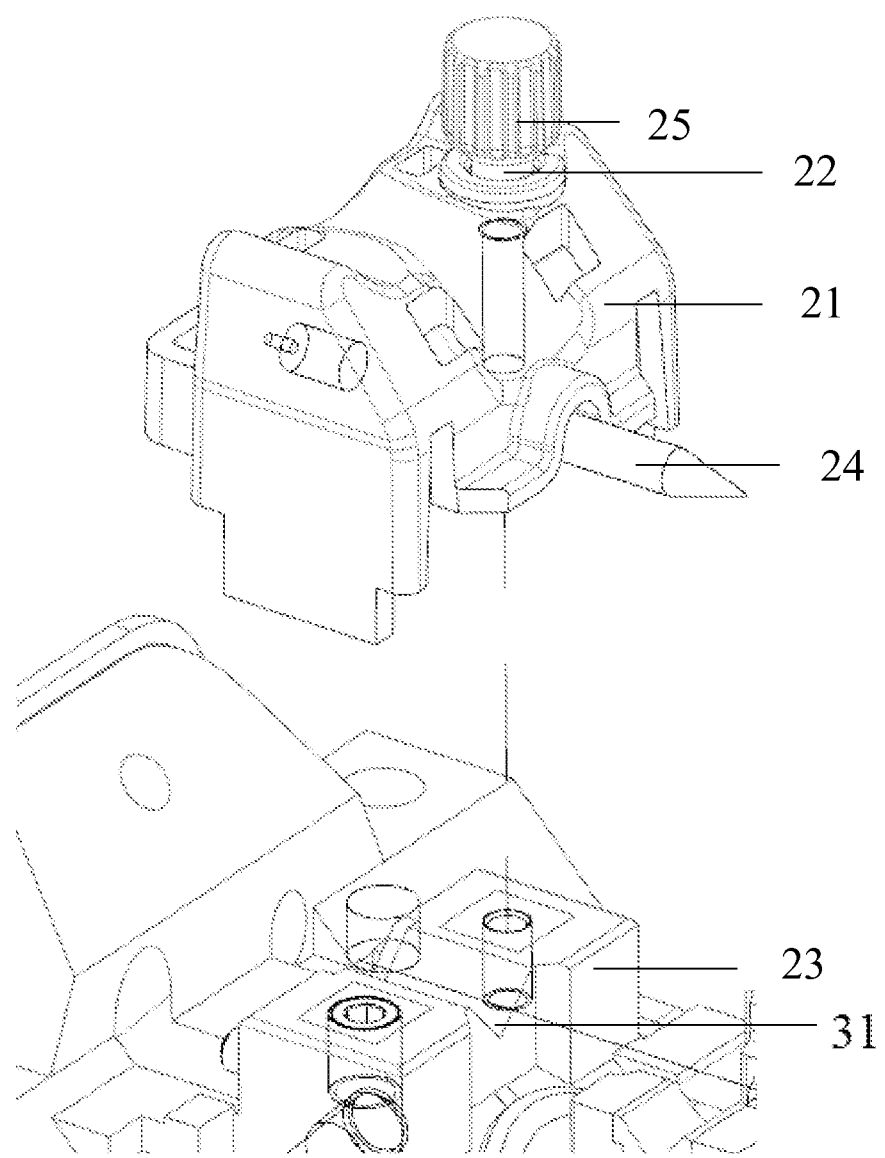
FIG. 6 is a structure schematic diagram of one implementation for the electrode gland of the optical fiber welding machine of the disclosed embodiments.

As shown in FIG. 6, the rotation unit is the nut 25 set at the top of the screw 22.

The nut 25 protrudes from the electrode gland body 1. When disassembling the electrode gland, twist the nut to loose screws from the workbench directly by hand to separate the electrode gland from the workbench, and then remove the electrode for replacement.

EXAMPLE TWO

Figure 7:
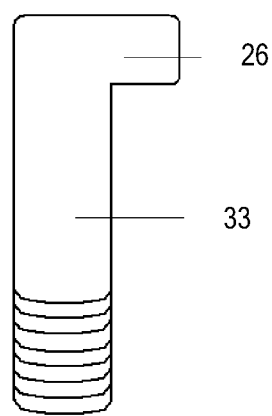
FIG. 7 is the structure schematic diagram for the L-shape handle of the electrode gland of the disclosed embodiments.

As shown in FIG. 7, the rotation unit is the L handle 26 setting at the top of the screw 33. The L handle 26 protrudes from the electrode gland body. When disassembling the electrode gland, twist the L handle to loose screws from the workbench directly by hand to separate the electrode gland from the workbench, and then remove the electrode for replacement.

EXAMPLE THREE

Figure 8:
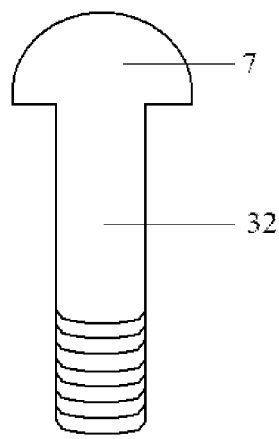
FIG. 8 is the structure schematic diagram for the D-shape handle of the electrode gland of the disclosed embodiments.

As shown in FIG. 8, the rotation unit is the D handle 7 setting at the top of the screw 32. The D handle 7 protrudes from the electrode gland body. When disassembling the electrode gland, twist the D handle to loose screws from the workbench directly by hand to separate the electrode gland from the workbench, and then remove the electrode for replacement.

EXAMPLE FOUR

Figure 9:
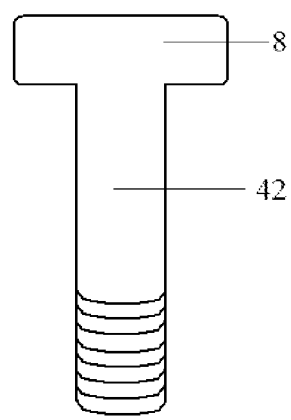
FIG. 9 is the structure schematic diagram for the T-shape handle of the electrode gland of the disclosed embodiments.

As shown in FIG. 9, the rotation unit is the T handle 8 setting at the top of the screw 42. The T handle 8 protrudes from the electrode gland body. When disassembling the electrode gland, twist the L handle to loose screws from the workbench directly by hand to separate the electrode gland from the workbench, and then remove the electrode for replacement.

The rotation unit can also be a cross handle etc. There is a rotation of the unit, which can be twisted directly by the hand, on the top of the screw of the electrode gland in the optical fiber welding machine of the disclosed embodiments. When disassembling the electrode gland, we only need to twist the rotation unit manually to loosen or tighten the screw, needing no spanner, and it is more convenient to disassemble the electrode gland.

The above disclosed are only several specific embodiments of this application, but this application is not limited to the above, and any change thought by the skilled in the art should fall in the scope of the protection scope of this application.

The invention claimed is:

1. An optical fiber welding machine, comprising:
   a butt joint device for splicing optical fibers, the butt joint device comprising:
      a base including a first stopped groove and a second stopped groove, wherein the first stopped groove and the second stopped groove have an approximate V-shape; and
      a first V-shape groove unit and a second V-shape groove unit that are fixedly mounted in the first stopped groove and the second stopped groove respectively;
      wherein the base, the first V-shape groove unit, and the second V-shape groove unit are three parts that are able to be separated from each other.

2. The optical fiber welding machine according to claim 1, wherein the butt joint device further comprises a number of screws for mounting the first V-shape groove unit and the second V-shape groove unit on the base.

3. The optical fiber welding machine according to claim 1, wherein the butt joint device further comprises buckles and slots, set on the base and on each of the units respectively, the buckles and slots matching each other such that said units are mounted on the base by clamping the buckles to the slots.

4. The optical fiber welding machine according to claim 1, wherein both the first V-shape groove unit and the second V-shape groove unit include two pieces, the two pieces being molded separately.

5. The optical fiber welding machine according to claim 1, wherein:
   two sidewalls of the each of the first stopped groove and the second stopped groove have an approximate right angle.

6. The optical fiber welding machine according to claim 1, wherein:
   the first V-shape groove unit comprises a first platform and a first support beam for supporting the first platform, a top surface of the first platform having a first V-shape groove;
   the second V-shape groove unit comprises a second platform and a second support beam for supporting the second platform, a top surface of the second platform having a second V-shape groove; and
   the first support beam and the second support beam are mounted along different directions.

7. The optical fiber welding machine according to claim 6, wherein:
   the first support beam includes a first vertical beam extended in a vertical direction, and a first inclined beam extended in a first direction; and
   the second support beam includes a second vertical beam extended in the vertical direction, and a second inclined beam in a second direction.

8. The optical fiber welding machine according to claim 7, wherein the first direction is perpendicular with the second direction.

9. The optical fiber welding machine according to claim 7, wherein:
   the first support beam further includes a first horizontal beam for connecting the first vertical beam and the first inclined beam; and
   the second support beam further includes a second horizontal beam for connecting the second vertical beam and the second inclined beam.

10. The optical fiber welding machine according to claim 9, wherein:
    the first horizontal beam and the second horizontal beam are extended in a same horizontal direction.

11. The optical fiber welding machine according to claim 10, wherein:
    a cross section of the first horizontal beam and a cross section of the second horizontal beam are coincident along the same horizontal direction.

* * * * *